(12) United States Patent
Nakamuta et al.

(10) Patent No.: US 6,751,291 B2
(45) Date of Patent: Jun. 15, 2004

(54) ROTARY ANODE TYPE X-RAY TUBE (75) Inventors: Hironori Nakamuta, Otawara (JP);
Mitsuo Iwase, Nasu-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/079,825

(22) Filed: Feb. 22, 2002

(65) Prior Publication Data

US 2002/0141538 A1 Oct. 3, 2002

(30) Foreign Application Priority Data

Feb. 23, 2001 (JP) ........................................ 2001-048641

(51) Int. Cl.[7] .................................................. H01J 35/10
(52) U.S. Cl. ........................................ 378/132; 378/133
(58) Field of Search ................................. 378/119, 143, 378/144, 132, 133

(56) References Cited

U.S. PATENT DOCUMENTS

| 4,210,371 A | 7/1980 | Gerkema et al. |
| 4,357,555 A | 11/1982 | Gerkema et al. |
| 4,614,445 A | 9/1986 | Gerkema et al. |
| 4,677,651 A | 6/1987 | Hartl et al. |
| 5,583,907 A | * 12/1996 | Ono et al. ............... 378/132 |
| 5,809,106 A | * 9/1998 | Kitade et al. ............ 378/132 |
| 6,546,078 B2 | * 4/2003 | Ide ......................... 378/133 |

FOREIGN PATENT DOCUMENTS

| DE | 19931296 A1 | 7/1999 |
| JP | 61206141 | 9/1988 |
| JP | 4-14742 | 1/1992 |
| JP | 5302621 | 11/1993 |
| JP | 10115319 | 5/1998 |
| WO | 00/58639 | 10/2000 |

* cited by examiner

*Primary Examiner*—Harshad Patel
(74) *Attorney, Agent, or Firm*—Pillsbury Winthrop LLP (57) ABSTRACT Disclosed is a rotary anode type X-ray tube comprising an anode target emitting an X-ray, a rotating mechanism for rotatably supporting the anode target, the rotating mechanism including an inside rotor and a stator, bearings being arranged between the inside rotor and the stator, and a vacuum envelope housing the anode target and the rotating mechanism. Dynamic slide bearings each using a liquid metal lubricant and ball bearings are used as the bearings arranged between the inside rotor and the stator.

7 Claims, 5 Drawing Sheets

ROTARY ANODE TYPE X-RAY TUBE

CROSS-REFERENCE TO RELATED APPLICATIONS

This application is based upon and claims the benefit of priority from the prior Japanese Patent Application No. 2001-048641, filed Feb. 23, 2001, the entire contents of which are incorporated herein by reference.

BACKGROUND OF THE INVENTION

1. Field of the Invention

The present invention relates to a rotary anode type X-ray tube, particularly, to a rotary anode type X-ray tube that permits preventing the bearing portion of the rotating mechanism rotatably supporting the anode target from being abraded.

2. Description of the Related Art

The rotary anode type X-ray tube is known as an electron tube in which a rotating anode target is irradiated with an electron beam so as to permit the anode target to emit an X-ray and is used in, for example, a medical diagnostic apparatus.

Figure 1:
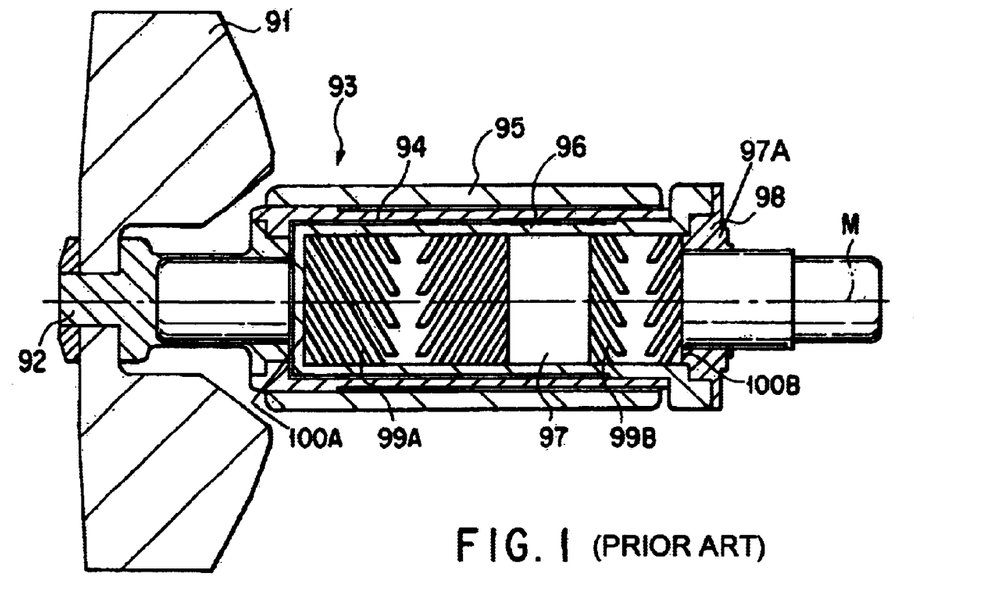
FIG. 1 is a cross sectional view schematically showing as an example the construction of a part of the conventional rotary anode type X-ray tube.

FIG. 1 is a cross sectional view schematically showing a part of the conventional rotary anode type X-ray tube. As shown in the drawing, the conventional rotary anode type X-ray tube comprises an anode target 91 arranged within a vacuum envelope (not shown). The anode target 91 is fixed to a support shaft 92, and the support shaft 92 is joined to a rotating mechanism 93.

The rotating mechanism 93 includes a rotor section and a stator section. The rotor section includes an intermediate rotor 94 joined to the support shaft 92, an outside rotor 95 mounted to the outside surface of the intermediate rotor 94, and an inside rotor 96 mounted to the inside surface of the intermediate rotor 94. A stator 97 is inserted into the inner region of the inside rotor 96 so as to be coupled with the inside rotor 96. That opening of the inside rotor 96 which corresponds to the right side in FIG. 1 is sealed with a thrust ring 98, and the stator 97 extends through the thrust ring 98 to the outside. Dynamic slide bearings which is so called as liquid film bearings or metal lubricated bearings are formed between the inside rotor 96 constituting the rotor section of the rotating mechanism 93 and the stator 97 constituting the stator section of the rotating mechanism 93 and between the thrust ring 98 and the stator 97 noted above. To be more specific, a pair of spiral grooves are formed in each of two regions apart from each other in the axial direction of, for example, the stator 97, and a liquid metal lubricant is supplied into the spiral grooves and the peripheral regions thereof so as to form radial dynamic slide bearings 99A and 99B.

Also, a spiral groove of a herringbone pattern is formed on the edge surface of the stator 97 shown on the left side of FIG. 1. A liquid metal lubricant is also supplied into the spiral groove and the peripheral region thereof so as to form a thrust dynamic slide bearing 100A, 100B. Likewise, a spiral groove of a herringbone pattern is formed on the surface, which corresponds to the right side of FIG. 1, of the thrust ring 98 facing a stepped portion 97A of the stator 97, and a liquid metal lubricant is supplied into the spiral groove and the peripheral region thereof so as to form a thrust dynamic slide bearing 100B. Incidentally, the letter "M" shown in FIG. 1 denotes the tube axis.

In the rotary anode type X-ray tube of the construction described above, a dynamic slide bearing is used as a bearing of the rotating mechanism. However, a roller bearing such as a ball bearing is also used in the bearing of the rotating mechanism.

The dynamic slide bearing is not abraded during the rotation and, thus, burning is not generated in the bearing even where the dynamic slide bearing is rotated at a high speed. However, the rotor is brought into contact with the stator at the starting time of the rotation and when the rotation is stopped. Also, where the dynamic slide bearing is rotated at a low angular speed, the dynamic slide bearing performs its function under the state that the rotor is partly kept in contact with the stator so as to bring about a so-called "mixed lubricating state" in which the contact force and the dynamic pressure are exerted simultaneously. It follows that, if the load of the rotor is heavy, a large stress is imparted to the contact portion.

As a result, the bearing surface is abraded at the start-up time or when the rotation of the rotor is stopped. Alternatively, burning is generated, and the rotor and the stator are meshed with each other so as to bite each other in the contact portion, thereby lowering the durability. Also, where the rotor has a large moment of inertia, the energy that is generated when the rotation of the rotor is stopped is increased so as to lower the durability. Particularly, where the center of gravity of the rotating portion is positioned outside the bearing, the force applied to the contact portion is rendered greater than the actual load so as to give a detrimental effect to the durability.

It should also be noted that the dynamic slide bearing requires a large rotational torque at the start-up time of the rotation. It follows that a rotation starting apparatus generating a large torque is required so as to render the apparatus bulky and increase the power consumption. In addition, where the angular speed of rotation is increased, the heat generation derived from the shearing force of the liquid metal lubricant is increased so as to elevate the temperature of the liquid metal lubricant. If the temperature of the liquid metal lubricant is elevated, the viscosity of the liquid metal lubricant is lowered so as to shorten the life of the liquid metal lubricant.

On the other hand, the roller bearing is advantageous in that the construction of the bearing is simple so as to facilitate the manufacture of the bearing. Also, since the rotor is not brought into contact with the stator at the start-up time and when the rotation of the rotor is stopped, the abrasion of the rotor and the stator is prevented. However, the bearing surface is abraded under the state of a high speed rotation or under the state of a heavy load so as to bring about the cracking and increase the noise during the rotation, with the result that the rotational torque is increased so as to cause burning in the bearing and generate noises.

BRIEF SUMMARY OF THE INVENTION

An object of the present invention is to provide a rotary anode type X-ray tube capable of suppressing the abrasion in the bearing portion of the rotating mechanism so as to assure good rotating characteristics over a long period of time.

According to a first aspect of the present invention, there is provided a rotary anode type X-ray tube, comprising:
an anode target configured to emit an X-ray;
a rotating mechanism configured to rotatably support the anode target, including a rotor section and a stator section;
a vacuum envelope configured to house the anode target and the rotating mechanism; and a bearing mechanism arranged between the rotor section and the stator section and including a dynamic slide bearing using a liquid metal lubricant and roller bearings.

According to a second aspect of the present invention, there is provided a rotary anode type X-ray tube, comprising:

an anode target configured to emit an X-ray;

a rotating mechanism configured to rotatably support the anode target, including a first rotor section to which the anode target is coupled, a second rotor section, a dynamic slide bearing being arranged between the first rotor section and the second rotor section, and a stator section, roller bearings being arranged between the second rotor section and the stator section; and a vacuum envelope configured to house the anode target and the rotating mechanism.

Further, according to a third aspect of the present invention, there is provided a rotary anode type X-ray tube, comprising:

an anode target configured to emit an X-ray;

a rotating mechanism configured to rotatably supporting the anode target, including a first rotor section to which the anode target is coupled, a second rotor section, roller bearings being arranged between the first rotor section and the second rotor section, and a stator section, a dynamic slide bearing using a liquid metal lubricant being arranged between the second rotor section and the stator section; and a vacuum envelope configured to house the anode target and the rotating mechanism.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention, and together with the general description given above and the detailed description of the embodiments given below, serve to explain the principles of the present invention.

DETAILED DESCRIPTION OF THE INVENTION

The rotary anode type X-ray tubes according to some embodiments of the present invention will now be described with reference to the accompanying drawings.

Figure 2:
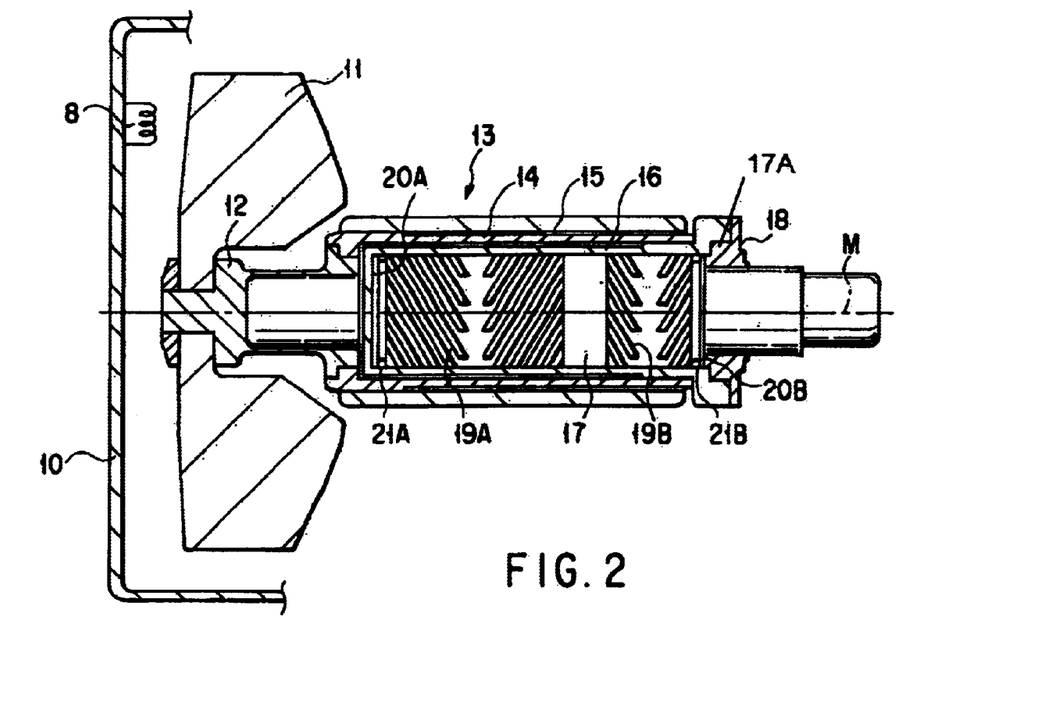
FIG. 2 is a cross sectional view schematically showing the construction of a part of a rotary anode type X-ray tube according to a first embodiment of the present invention.

FIG. 2 is a cross sectional view schematically showing the construction of a rotary anode type X-ray according to a first embodiment of the present invention.

As shown in the drawing, the rotary anode type X-ray tube according to the first embodiment of the present invention comprises a vacuum envelope 10. Only a part of the vacuum envelope 10 is shown in FIG. 2. Arranged within the vacuum envelope 10 are a cathode 8 emitting an electron beam and an anode target 11 against which an electron beam emitted from the cathode 8 strikes so as to cause the anode target 11 to emit an X-ray. The anode target 11 is fixed to a support shaft 12, the support shaft 12 is joined to a rotating mechanism 13, and the anode target 11 is rotatably supported by the rotating mechanism 13.

The rotating mechanism 13 includes a rotor section and a stator section. The rotor section includes, for example, an intermediate rotor 14 to which the support shaft 12 is joined directly, an outside rotor 15 joined to the outside surface of the intermediate rotor 14, and an inside rotor 16 joined to the inside surface of the intermediate rotor 14. Also, a stator 17 is inserted into the inner region of the inside rotor 16 so as to be coupled with the inside rotor 16. The opening of the inside rotor 16 on the right side in FIG. 2 is sealed with a thrust ring 18, and the stator 17 extends through the thrust ring 18 to the outside.

In the rotating mechanism 13 of the construction described above, dynamic slide bearings which is so called as liquid film bearings or metal lubricated bearings are formed between, for example, the inside rotor 16 constituting the rotor section of the rotating mechanism 13 and the stator 17 constituting the stator section of the rotating mechanism 13 and between the thrust ring 18 and the stator 17 noted above.

For example, a pair of spiral grooves are formed in each of two regions apart from each other in the axial direction of the stator 17, and a liquid metal lubricant is supplied to these spiral grooves and the peripheral portions thereof so as to form radial dynamic slide bearings 19A and 19B.

A spiral groove of a herringbone pattern is formed on the edge surface of the stator 17 on the left side in FIG. 2, and a liquid metal lubricant is supplied into the spiral groove and the peripheral portion thereof so as to form a thrust dynamic slide bearing 20A. Likewise, a spiral groove of a herringbone pattern is also formed on the surface, which is shown on the right side of FIG. 2, of the thrust ring 18 facing a stepped portion 17A of the stator 17, and a liquid metal lubricant is supplied into the spiral groove and the peripheral portion thereof so as to form an additional thrust dynamic slide bearing 20B.

Also, roller bearings, e.g., ball bearings 21A and 21B, are formed in two regions of the outer circumferential surface apart from each other in the axial direction of the stator 17. For example, the ball bearing 21A is formed on the outside in the axial direction of the radial dynamic slide bearing 19A, which is positioned on the left side in FIG. 2. On the other hand, the ball bearing 21B is formed on the outside in the axial direction of the radial dynamic slide bearing 19B, which is positioned on the right side in FIG. 2.

The ball bearings 21A and 21B are arranged such that the rolling surfaces thereof, e.g., the ball surfaces, are not brought into contact with the inside surface of the rotor 16 during the operation, e.g., where the rotor section of the rotating mechanism 13 is rotated at an ordinary rotating speed. On the other hand, the inside rotor 16 is arranged to bring about a so-called "tough down" phenomenon that the inside rotor 16 is brought into contact with the rolling surfaces of the ball bearings 21A, 21B in the case where, for example, the rotary shaft of the rotating mechanism 13 is inclined relative to the axis of the stator 17 so as to bring a part of the inside rotor 16 to a region close to the stator 17 at the start-up time or when the operation is stopped. To be more specific, the bearing mechanism is constructed to provide appropriate gaps between the ball bearing 21A and the inside rotor 16 and between the ball bearing 21B and the inside rotor 16 in the case where the rotor section of the rotating mechanism 13 is rotated at an ordinary rotating speed. In the rotating mechanism 13, it is generally desirable for the bearing gap between the outer surface of the stator 17 and the inside surface of the rotor 16 to be not larger than 20 $\mu$m, preferably to fall within a range of between 5 $\mu$m and 15 $\mu$m, so as to permit forming recesses receiving the ball bearings 21A, 21B in the stator 17. It is also desirable for each of the distance between the tip inside the gap of the ball bearing 21A and inside surface of the rotor 16 and the distance between the tip inside the ball bearing 21B and the inside surface of the rotor 16 to fall within a range of between 2 $\mu$m and 12 $\mu$m in order to permit the ball bearings 21A, 21B to protrude by about 3 $\mu$m from the outer surface of the stator 17. Incidentally, the letter "M" shown in FIG. 2 represents the tube axis.

According to the rotary anode X-ray tube of the construction described above, the inside rotor 16 is brought into contact with the ball bearings 21A, 21B so as to avoid the direct contact between the inside rotor 16 and the stator 17 in the case where the rotor section of the rotating mechanism 13 is inclined at the start-up time or when the operation is stopped. As a result, the abrasion and burning of the bearing surface are prevented so as to improve the durability in respect of the biting.

Incidentally, if the operation is stopped under the state that, for example, the tube axis extends substantially in the horizontal direction, and the axis of the inside rotor 16 is inclined, it is highly possible for the both edge portions in the outer circumferential surface of the inside rotor 16 to be brought into contact with the stator 17. Such being the situation, the ball bearings 21A, 21B are arranged in the both edge portions of the inside rotor 16, i.e., in the outside regions in the axial direction of the radial dynamic slide bearings.

The bearing mechanism is not constructed to prevent the contact between the inside rotor 16 and the stator 17 in the thrust direction. However, the particular bearing mechanism is advantageous in that the construction of the bearing mechanism is simple. Also, when it comes to, for example, an X-ray tube for a CT apparatus in which the X-ray tube is used in many cases with the tube axis held to extend in the horizontal direction, a practical problem is scarcely generated because the inside rotor 16 is scarcely brought into contact with the stator 17 in the thrust direction.

The rotary anode type X-ray tubes according to second to tenth embodiments of the present invention will now be described with reference to FIGS. 3 to 9. It should be noted that the upper half and the lower half of each of the inside rotor 16 and the stator 17 are in symmetry with respect to the tube axis M. Therefore, each of FIGS. 3 to 9 is a cross sectional view schematically showing the construction of the upper half alone of each of the inside rotor 16 and the stator 17 for simplifying the drawing. Incidentally, the reference numerals put to the members of the X-ray tube shown in FIG. 2 are also put to the corresponding members of the X-ray tubes shown in FIGS. 3 to 9 so as to avoid an overlapping description.

Figure 3:
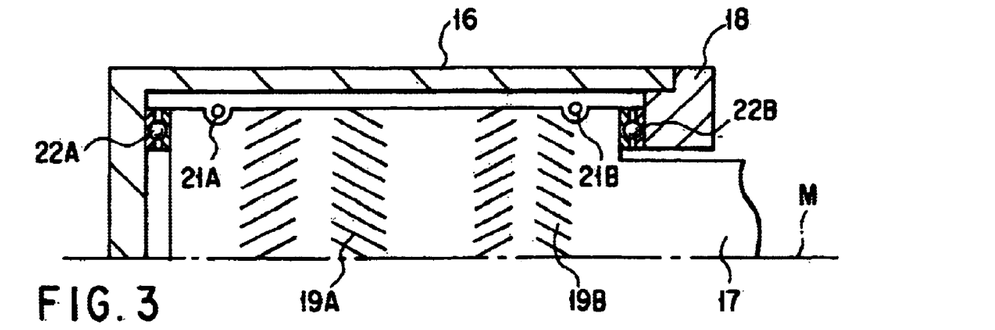
FIG. 3 is a cross sectional view schematically showing the construction of the rotating mechanism included in a rotary anode type X-ray tube according to a second embodiment of the present invention.

The rotary anode type X-ray tube shown in FIG. 3 is constructed such that, in the bearing mechanism on the radial side, the dynamic slide bearings 19A, 19B are formed in two regions on the stator 17 apart from each other in the direction of the tube axis, and the ball bearings 21A, 21B of the touch down structure are formed outside the dynamic slide bearings 19A, 19B, respectively. Further, in the bearing mechanism on the thrust side, a ball bearing 22A is formed in, for example, an annular arrangement between the edge surface of the stator 17 on the left side of FIG. 3 and the inside rotor 16, and a ball bearing 22B is formed in, for example, an annular arrangement between the stepped portion of the stator 17 and the thrust ring 18. The rolling surfaces of the ball bearings 22A, 22B are of the contact structure that these rolling surfaces are kept in contact with the inside rotor 16 and the stator 17 during the ordinary rotation and at the time when the operation of the X-ray tube is stopped. Because of the particular construction, the ball bearings 21A and 21B serve to prevent the inside rotor 16 and the stator 17 from being brought into mutual contact in the radial direction. On the other hand, the ball bearings 22A and 22B serve to prevent the inside rotor 16 and the stator 17 from being brought into mutual contact in the thrust direction.

Figure 4:
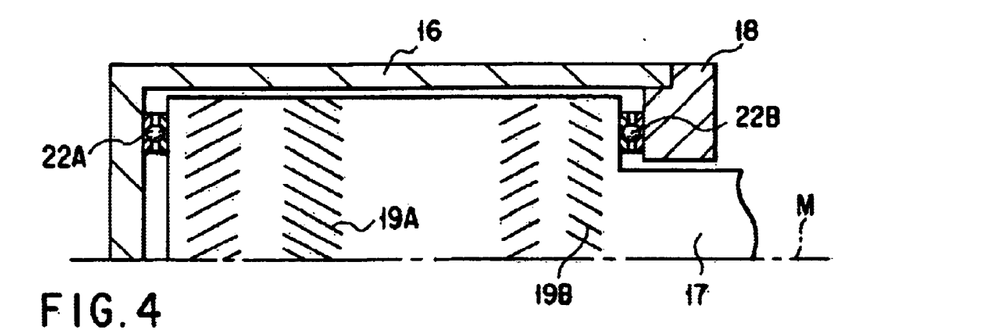
FIG. 4 is a cross sectional view schematically showing the construction of the gist portion of the rotating mechanism included in a rotary anode type X-ray tube according to a third embodiment of the present invention.

The rotary anode type X-ray tube shown in FIG. 4 is constructed such that the dynamic slide bearings 19A, 19B are arranged in the bearing mechanism on the radial side. On the other hand, in the bearing mechanism on the thrust side, the ball bearing 22A of a constant contact structure is formed between the edge surface of the stator 17 on the left side of FIG. 4 and the inside rotor 16, and the ball bearing 22B of a constant contact structure is formed between the stepped portion 17A and the thrust ring 18. The ball bearings 22A and 22B constitute a so-called "angular contact" structure in which both the inside rotor 16 and the stator 17 are supported in, for example, both the radial direction and the thrust direction. Because of the particular construction of the bearing mechanism, the ball bearings 22A and 22B serve to prevent the inside rotor 16 and the stator 17 from being brought into mutual contact in any of the thrust direction and the radial direction.

Figure 5:
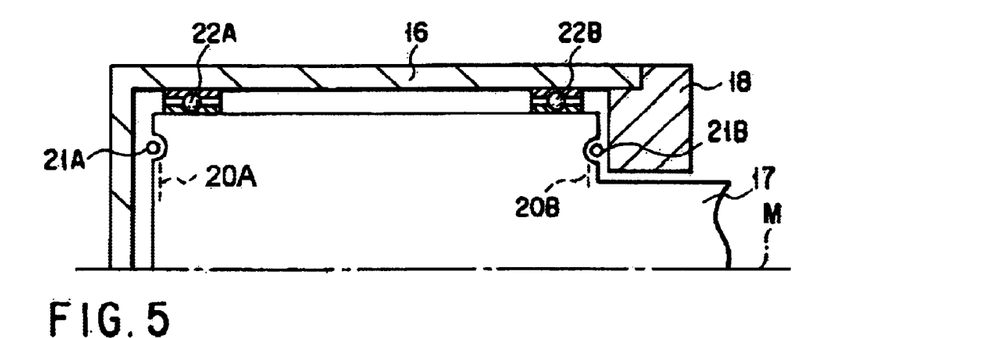
FIG. 5 is a cross sectional view schematically showing the construction of the gist portion of the rotating mechanism included in a rotary anode type X-ray tube according to a fourth embodiment of the present invention.

The rotary anode type X-ray tube shown in FIG. 5 is constructed such that the ball bearings 22A, 22B of a constant contact structure are arranged in the bearing mechanism on the radial side. To be more specific, each of the stator 17 and the inside rotor 16 is provided with bearing receptacles receiving the ball bearings 22A and 22B, and the ball bearings 22A, 22B are arranged in these bearing receptacles. On the other hand, the dynamic slide bearings 20A, 20B and the ball bearings 21A and 21B of the touch down structure are arranged in the bearing mechanism on the thrust side. According to the particular construction of the bearing mechanism, the ball bearings 22A, 22B serve to prevent the inside rotor 16 and the stator 17 from being brought into mutual contact in the radial direction, and the ball bearings 21A, 21B serve to prevent the inside rotor 16 and the stator 17 from being brought into mutual contact in the thrust direction.

Figure 6:
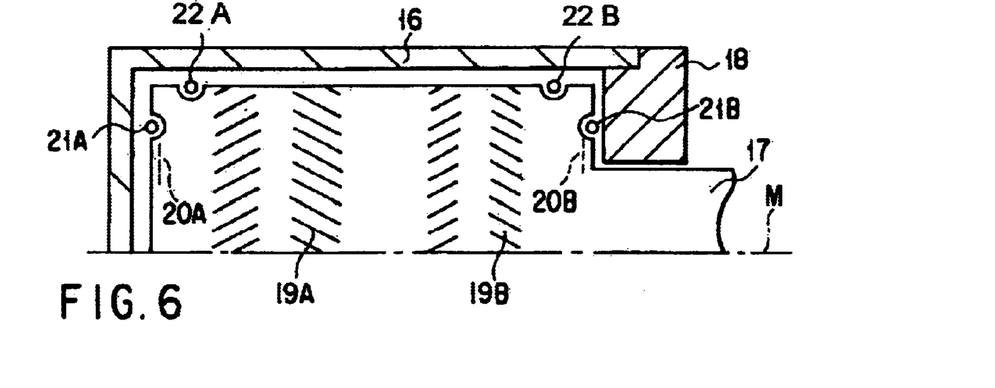
FIG. 6 is a cross sectional view schematically showing the construction of the gist portion of the rotating mechanism included in a rotary anode type X-ray tube according to a fifth embodiment of the present invention.

The rotary anode type X-ray tube shown in FIG. 6 is constructed such that the dynamic slide bearings 19A, 19B and the ball bearings 21A, 21B of a touch down structure are arranged in the bearing mechanism on the radial side, and the dynamic slide bearings 20A, 20B and the ball bearings 21A, 21B of a touch down structure are also arranged in the bearing mechanism on the thrust side. According to the particular construction of the bearing mechanism, the ball bearings 21A, 21B serve to prevent the inside rotor 16 and the stator 17 from being brought into mutual contact in both the thrust direction and the radial direction at the start-up time and when the operation of the X-ray tube is stopped. During the ordinary rotation, the radial direction is supported by the dynamic slide bearings 19A, 19B, and the thrust direction is supported by the dynamic slide bearings 20A, 20B.

Incidentally, if the operation of the X-ray tube is stopped under the state that the tube axis of the X-ray tube extends in, for example, substantially vertical direction and the axis of the inside rotor 16 is inclined, it is possible for the inside rotor 16 to be brought into contact in many cases with the outer circumferential surface in the edge surface of the stator 17. Such being the situation, in the X-ray tube shown in FIG. 6, the ball bearings 21A, 21B are arranged in the outer circumferential surface region in the edge surface of the stator 17, i.e., on the outside in the radial direction of the radial dynamic slide bearing.

Figure 7:
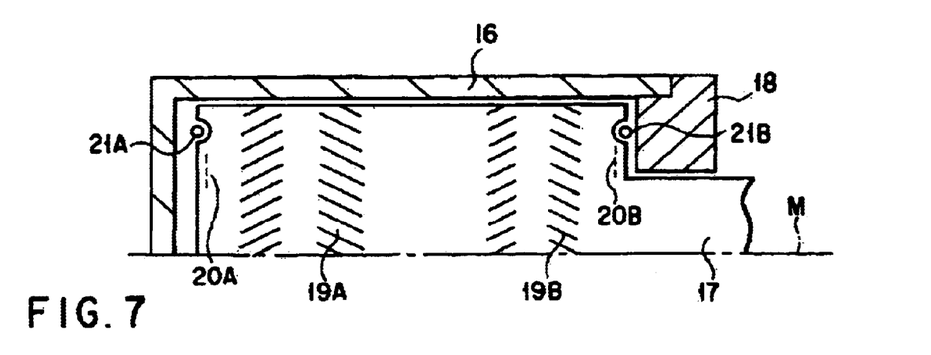
FIG. 7 is a cross sectional view schematically showing the construction of the gist portion of the rotating mechanism included in a rotary anode type X-ray tube according to a sixth embodiment of the present invention.

The rotary anode type X-ray tube shown in FIG. 7 is constructed such that the dynamic slide bearings 19A, 19B are arranged in the bearing mechanism on the radial side. Also, the dynamic slide bearings 20A, 20B and the ball bearings 21A, 21B of a tough down structure are arranged in the bearing mechanism on the thrust side. According to the bearing mechanism of the particular construction, the ball bearings 21A and 21B serve to prevent the inside rotor 16 and the stator 17 from being brought into mutual contact in the thrust direction at the start-up time and when the operation of the X-ray tube is stopped. Incidentally, the particular bearing mechanism is not constructed to prevent the inside rotor 16 and the stator 17 from being brought into mutual contact in the radial direction. However, the particular bearing mechanism is simple in construction. Also, when it comes to an X-ray tube for an apparatus in which the X-ray tube is used under the state that the tube axis extends in the vertical direction, a practical problem is scarcely generated because the contact in the radial direction is unlikely to take place.

Figure 8:
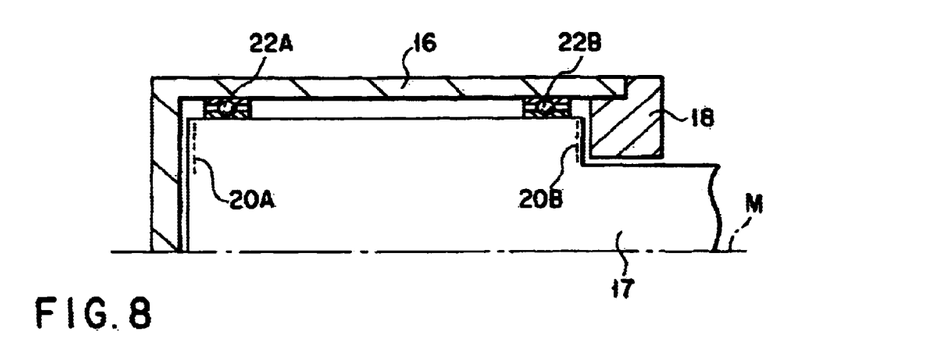
FIG. 8 is a cross sectional view schematically showing the construction of the gist portion of the rotating mechanism included in a rotary anode type X-ray tube according to a seventh embodiment of the present invention.

The rotary anode type X-ray tube shown in FIG. 8 is constructed such that the ball bearings 22A, 22B of a constant contact structure are arranged in the bearing mechanism on the radial side. Also, the dynamic slide bearings 20A, 20B are arranged in the bearing mechanism on the thrust side. In the bearing mechanism of the particular construction, used are the ball bearings 22A, 22B of, for example, an angular contact structure, and the contact in the thrust direction and the contact din the radial direction are prevented by the ball bearings 22A, 22B. Incidentally, during the ordinary rotation, the radial direction is supported by the ball bearings 22A, 22B, and the thrust direction is supported by the dynamic slide bearings 20A, 20B.

Figure 9:
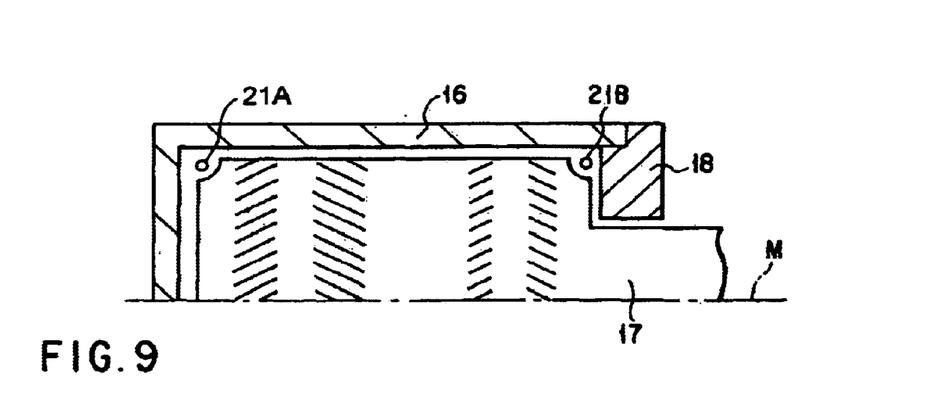
FIG. 9 is a cross sectional view schematically showing the construction of the gist portion of the rotating mechanism included in a rotary anode type X-ray tube according to an eighth embodiment of the present invention.

The rotary anode type X-ray tube shown in FIG. 9 is constructed such that the ball bearings 21A, 21B of a touch down structure are arranged in the outer circumferential portion in the edge surface of the stator 17. In the bearing mechanism of the particular construction, the contact in the thrust direction and the contact in the radial direction are prevented by the ball bearings 21A, 21B.

In the rotary anode type X-ray tube shown in each of FIGS. 2 to 9, the ball bearing is arranged in a region in which a liquid metal lubricant is loaded. It follows that it is desirable for the ball forming the rolling surface to be formed of a metal such as steel or a ceramic material such as silicon nitride. Also, it is possible to apply a solid lubricating film to the ball even in the case where the ball is dipped in the liquid metal lubricant. In this case, it is desirable for the solid lubricating film to be formed of a metal that is highly wettable with the liquid metal lubricant. For example, it is desirable for the solid lubricating film to be formed of lead, silver, platinum, gold, tin or indium.

In each of the embodiments described above, the ball bearings 21A, 21B of a touch down structure are mounted on the side of the stator. However, it is possible to mount the ball bearings 21A, 21B of a touch down structure on the side of the inside rotor 16.

Also, in each of the embodiments shown in FIGS. 2 and 9, the roller bearings are not arranged in the thrust direction. In the particular construction, regions for mounting the roller bearings are not required so as to make it possible to increase the outer diameter of the stator and to increase the mechanical strength of the stator.

Further, in each of the embodiments shown in FIGS. 2, 6 and 7, used are the roller bearings of a touch down structure, not the roller bearings of a constant contact structure. In the particular construction, it is possible to suppress the abrasion of the bearing surface during the high speed rotation so as to obtain stable rotating characteristics over a long period of time.

Figure 10:
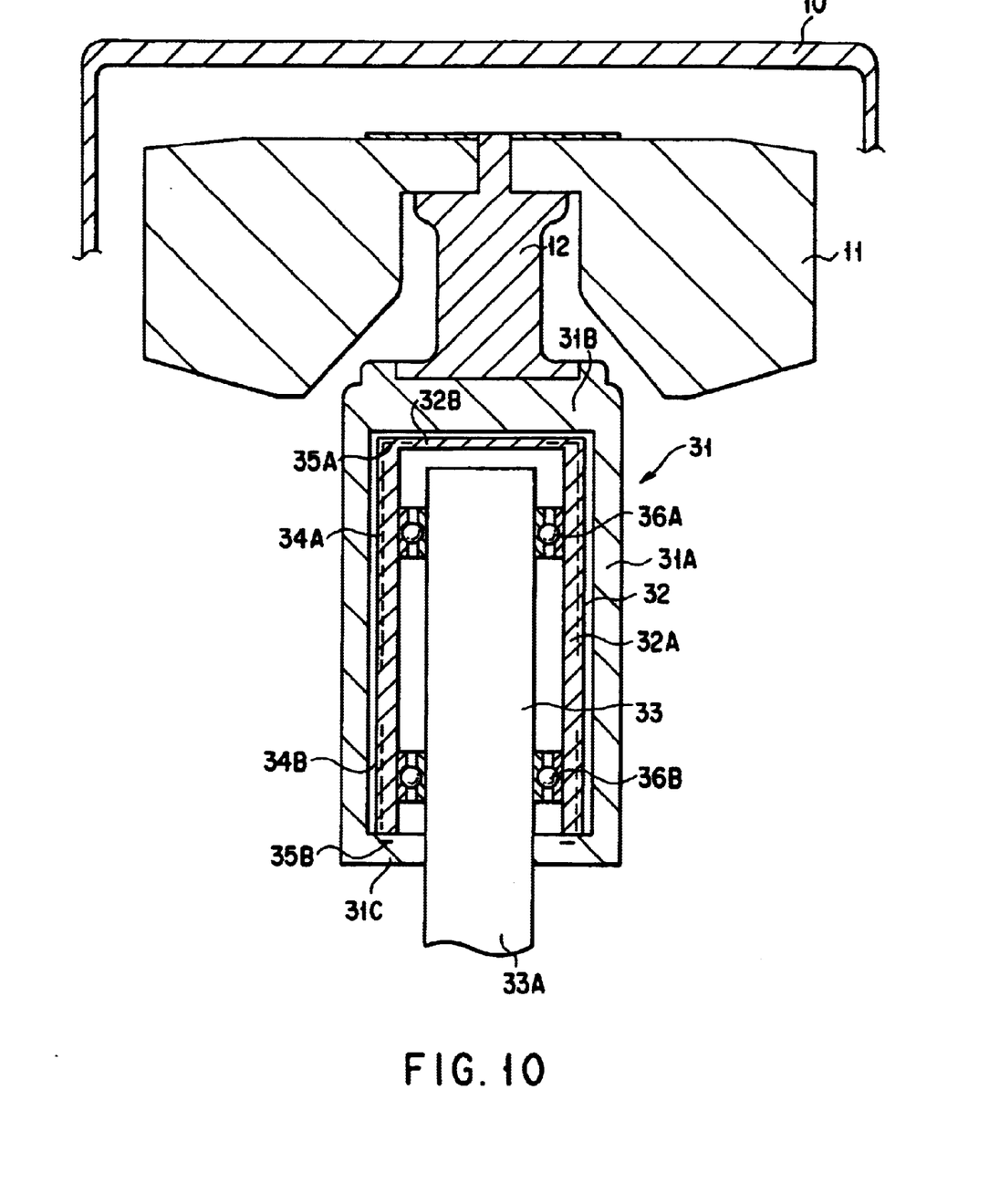
FIG. 10 is a cross sectional view schematically showing the construction of a rotary anode type X-ray tube according to a ninth embodiment of the present invention.

FIG. 10 is a cross sectional view showing the construction of the rotary anode type X-ray tube according to another embodiment of the present invention. Incidentally, the reference numerals put to the members of the X-ray tube shown in FIG. 2 are also put to the corresponding members of the X-ray tube shown in FIG. 10 so as to avoid an overlapping description.

In the X-ray tube shown in FIG. 10, a support shaft 12 fixed to the anode target 11 is joined to a first rotor 31. The first rotor 31 comprises, for example, a cylindrical section 31A, a disk-like bottom section 31B positioned on the side of the anode target 11 of the cylindrical section 31A, and a disk-like edge section 31C positioned on the side opposite to the bottom section 31B of the cylindrical section 31A and provided with a through hole in the center. The support shaft 12 is joined to, for example, the bottom section 31B.

Also, a second rotor 32 is arranged inside the first rotor 31 with a small gap provided between the outer surface of the second rotor 32 and the inner surface of the first rotor 31.

The second rotor 32 is formed in the shape of, for example, a cylinder having a bottom and includes, for example, a cylindrical section 32A and a bottom section 32B positioned on the side of the anode target 11 of the cylindrical section 32A.

A stator 33 is arranged inside the second rotor 32, and an edge section 33A of the stator 33, said edge section 33A supporting the bearings shown in FIG. 10, extends downward from within the second rotor 32 through the opening of the second rotor 32 and the through hole made in the edge section 31C of the first rotor 31.

In the construction described above, dynamic slide bearings are arranged between the first rotor 31 and the second rotor 32. For example, a pair of spiral grooves are formed in each of two regions on the outer circumferential surface of the second rotor 32, said two regions being apart from each other in the direction of the tube axis, and a liquid metal lubricant is supplied to the portions of the spiral grooves so as to form radial dynamic slide bearings 34A, 34B.

Also, a spiral groove of a herringbone pattern is formed on the upper surface of the second rotor 32 shown in FIG. 10, and a liquid metal lubricant is supplied to the spiral groove portion so as to form a thrust dynamic slide bearing 35A. A spiral grove of a herringbone pattern is also formed on the upper surface of the edge section 31C of the first rotor 31 facing the lower surface of the second rotor 32, and a liquid metal lubricant is also supplied to the spiral groove portion so as to form an additional thrust dynamic slide bearing 35B.

Further, roller bearings, e.g., ball bearings 36A, 36B, are arranged between the second rotor 32 and the stator 33 so as to be positioned apart from each other in the direction of the tube axis. The ball bearings 36A, 36B used in this embodiment are of a constant contact structure and of, for example, an angular contact structure effective for supporting the second rotor 32 and the stator 33 in both the radial direction and the thrust direction.

Where the X-ray tube of the construction described above is put under an operating state, the first rotor 31 is rotated by the rotating magnetic field generated from a coil (not shown) arranged on the outside of the first rotor 31. Incidentally, the dynamic slide bearing does not perform its normal function of the bearing when the rotation is stopped, with the result that the first rotor 31 and the second rotor 32 are partly in a solid contact. It follows that the first rotor 31 and the second rotor 32 are caused to start their rotations substantially together by the mutual contact friction, and the first rotor 31 and the second rotor 32 are rotated at the same speed around the stator 33 under the functions performed by the ball bearings 36A, 36B.

Then, if the rotating speed is increased, slippage takes place between the first rotor 31 and the second rotor 32 because of the shearing force of the liquid metal lubricant loaded between the first rotor 31 and the second rotor 32, with the result that the viscosity coefficient of the liquid metal lubricant is lowered. In this stage, the rotating energy of the first rotor 31 is unlikely to be transmitted to the second rotor, resulting in a difference in the rotating speed between the first rotor 31 and the second rotor 32. The difference in the rotating speed is gradually increased so as to enable the dynamic slide bearings arranged between the first rotor 31 and the second rotor 32 to perform their normal functions of the bearings, with the result that a stable high speed rotation can be achieved.

According to the X-ray tube shown in FIG. 10, the dynamic slide bearings arranged between the first rotor 31 and the second rotor 32 perform their functions even if the frictional force of the ball bearings is increased under the state of the high speed rotation, with the result that the ball bearings, etc. are prevented from being abraded. Also, the start-up torque is determined by the frictional force of the ball bearings alone. It follows that the torque in the start-up time is rendered smaller than that in the case of the dynamic slide bearings so as to make it possible to miniaturize the rotation starting apparatus and to decrease the power consumption.

Figure 11:
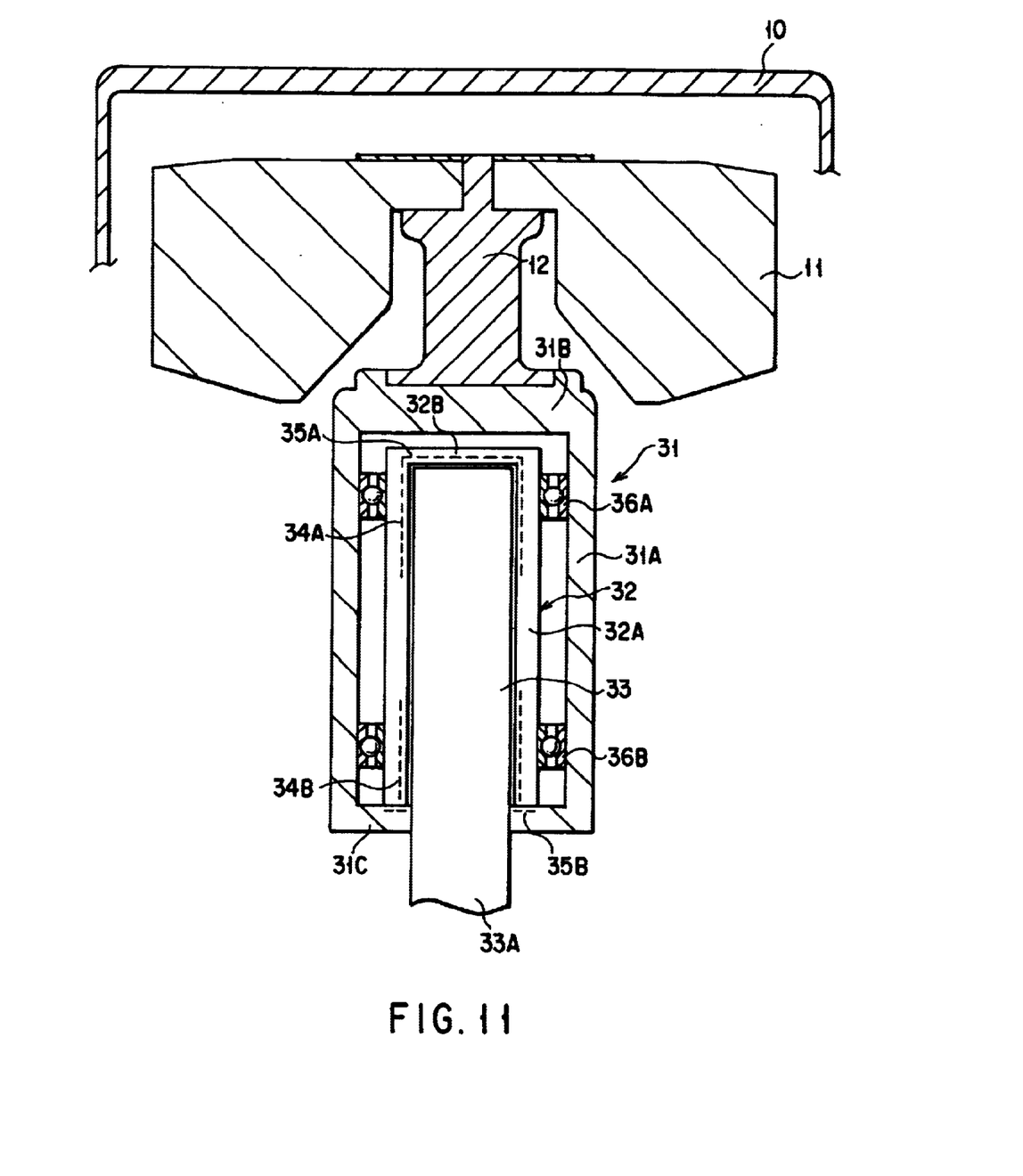
FIG. 11 is a cross sectional view schematically showing the construction of a rotary anode type X-ray tube according to a tenth embodiment of the present invention.

In the X-ray tube apparatus according to the embodiment shown in FIG. 10, the ball bearings are arranged for supporting the rotor in the radial direction. These ball bearings can also be arranged for supporting the rotor in the thrust direction. Also, the dynamic slide bearings are arranged between the first rotor 31 and the second rotor 32, and roller bearings, e.g., ball bearings 36A, 36B, are arranged between the second rotor 32 and the stator 33. However, it is also possible to arrange roller bearings, e.g., the ball bearings 36A, 36B, between the first rotor 31 and the second rotor 32 and to arrange the dynamic slide bearings between the second rotor 32 and the stator 33, as shown in FIG. 11. Incidentally, the reference numerals put to the members of the X-ray tube shown in FIG. 10 are also put to the corresponding members of the X-ray tube shown in FIG. 11 so as to avoid an overlapping description. Needless to say, the description relating to FIG. 10 is effective for clarifying the details of the X-ray tube shown in FIG. 11.

As described above, the present invention provides a rotary anode type X-ray tube, which permits preventing the bearing section of the rotating mechanism rotatably supporting the anode target from being abraded, permits a long life even if the X-ray tube is rotated at a high speed, and also permits exhibiting stable rotating characteristics over a long period of time.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rotary anode type X-ray tube, comprising:
    an anode target configured to emit an X-ray;
    a rotating mechanism configured to rotatably support said anode target, including a rotor section and a stator section;
    a vacuum envelope configured to house said anode target and said rotating mechanism;
    a bearing mechanism arranged between said rotor section and said stator section and including a dynamic slide bearing using a liquid metal lubricant, and roller bearings; and
    means for rotating the rotor section at a predetermined speed;
    wherein the rotor section is rotatably supported by the dynamic slide bearing in a rotating mode in which the rotor section rotates at the predetermined speed, and the rotor section is supported by the roller bearings in a stopping mode in which the rotor section does not rotate and in a starting mode in which the rotor section begins to rotate.

2. The rotary anode type X-ray tube according to claim 1, wherein roller bearings are arranged outside in the radial direction of the radial dynamic slide bearings arranged between the rotor section and the stator section.

3. The rotary anode type X-ray tube according to claim 1, wherein roller bearings are arranged outside in the radial direction of the thrust dynamic slide bearings arranged between the rotor section and the stator section.

4. The rotary anode type X-ray tube according to claim 1, wherein roller bearings are mounted to said stator section such that the rolling surfaces of said roller bearings are not in contact with said rotor section in a state wherein the axis of said rotor section coincides with the axis of said stator section, and that the rolling surfaces of said roller bearings are brought into contact with said rotor section in a state wherein the axis of said rotor section is inclined relative to the axis of said stator section.

5. The rotary anode type X-ray tube according to claim 1, wherein roller bearings are mounted to said rotor section such that the rolling surfaces of said roller bearings are not in contact with said stator section in a state wherein the axis of said rotor section coincides with the axis of said stator section, and that the rolling surfaces of said roller bearings are brought into contact with said stator section in a state wherein the axis of said rotor section is inclined relative to the axis of said stator section.

6. A rotary anode type X-ray tube, comprising:

an anode target configured to emit an X-ray;

a rotating mechanism configured to rotatably support said anode target, including a first rotor section to which said anode target is coupled, a second rotor section, a dynamic slide bearing being arranged between said first rotor section and said second rotor section, and a stator section, roller bearings being arranged between said second rotor section and said stator section;

a vacuum envelope configured to house said anode target and said rotating mechanism; and means for rotating the first rotor section at a predetermined speed;

wherein the first rotor section is rotatably supported by the dynamic slide bearing in a rotating mode in which the first rotor section rotates at the predetermined speed, and the second rotor section is supported by the roller bearings in a stopping mode in which the second rotor section does not rotate and in a starting mode in which the rotor section begins to rotate.

7. A rotary anode type X-ray tube, comprising:

an anode target configured to emit an X-ray;

a rotating mechanism configured to rotatably support said anode target, including a first rotor section to which said anode target is coupled, a second rotor section, roller bearings being arranged between said first rotor section and said second rotor section, and a stator section, a dynamic slide bearing using a liquid metal lubricant being arranged between said second rotor section and said stator section a vacuum envelope configured to house said anode target and said rotating mechanism; and means for rotating the first rotor section at a predetermined speed;

wherein the second rotor section is rotatably supported by the dynamic slide bearing in a rotating mode in which the second rotor section rotates at the predetermined speed, and the first rotor section is supported by the roller bearings in a stopping mode in which the first rotor section does not rotate and in a starting mode in which the first rotor section begins to rotate.

* * * * *